O. B. HOWARD.

Razor-Strops.

No. 5,910. Reissued June 9, 1874.

Witnesses.
Frank H. Jordan,
Edwin H. Haskell

Inventor,
Oliver B. Howard,
per Atty.
Wm. Henry Clifford.

AM. PHOTO-LITHOGRAPHIC Co. N. Y. (OSBORNE'S PROCESS.)

UNITED STATES PATENT OFFICE.

OLIVER B. HOWARD, OF PORTLAND, MAINE, ASSIGNOR OF ONE-HALF INTEREST TO OLIVER P. SHEPHERD, OF SAME PLACE.

IMPROVEMENT IN RAZOR-STROPS.

Specification forming part of Letters Patent No. 117,421, dated July 25, 1871; reissue No. 5,402, dated May 13, 1873; reissue No. 5,910, dated June 9, 1874; application filed December 26, 1873.

*To all whom it may concern:*

Be it known that I, OLIVER B. HOWARD, of Portland, in the county of Cumberland and State of Maine, have invented certain new and useful Improvements in Razor-Strops; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
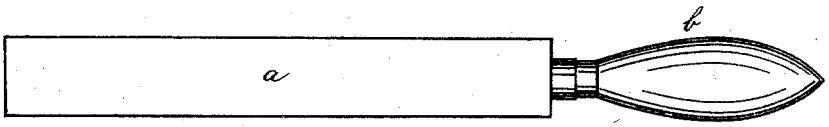
Figure 2:
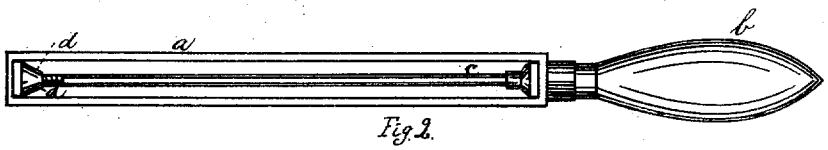
Figure 3:
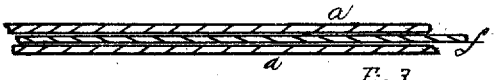

Figure 1 is a face view. Fig. 2 is a side elevation. Fig. 3 is a detail.

Same letters show like parts.

My invention has for its object the production of a razor-strop which shall possess the requisite yielding property under the pressure of the razor when the same is applied to it for sharpening; also it has for its object to produce a strop, the whetting-surface of which may be rendered more or less rigid, as dedesired, by tightening, and at the same time be prevented from the liability of stretching, wrinkling, or becoming in any way uneven.

In common with other strops mine shows a leather surface to which the razor is applied.

I will first describe the manner in which I construct the band to which the razor is applied. I first take a sheet of thin light flexible metal of proper width, and place around it a strip of leather having a proper surface, for the purpose of sharpening the blade. This leather I then cement or otherwise fasten to the metal strip at a convenient place along the entire length of both the leather and the metal strip.

The other parts of my invention may be thus described. *b* shows the handle. To this handle *b* is attached the rod *c*, having at its outer end—that is, the end farthest from the handle *b*—the screw *d*, which works into the end, or rather is attached to the end piece over which the band *a* is doubled. The band *a* is rigidly attached to the handle *b*, and thus, as will be seen, the band *a* may be loosened or tightened at the will of the user.

It will now be seen that the band *a* is not liable to be stretched, wrinkled, or turned up at the edges when tightened by the employment of the screw, because the strip of metal around which the leather is wound will both maintain a flat and even position. and resist the longitudinal strain. Moreover, the flexibility of the metal strip enables it to bend or yield slightly as the razor is drawn over it in sharpening. The desired degree of rigidity can thus be imparted to the sharpening-surface of the strop by the use of the screw, without injury to the leather, and the user can adjust the band *a* as to degree of tightness or looseness as he may desire without producing any effect upon the leather which is wound around the unyielding inner strip or non-extensible base. In Fig. 3, *f* shows the non-extensible base, and the leather is represented over the same.

In my invention the leather is cemented to the non-extensible base, so as to lie smooth and even on the same upon the top where the razor is applied, and when the whole band is tightened by the operation of the screw and handle the strain of such tightening is taken by the non-extensible base. None is received by the leather, since the base neither expands nor contracts, but only bends inward or outward slightly when the strain of tightening by the screw is taken off.

It will be observed that the strip of leather and the non-extensible base are not simply laid together one upon the other and then cemented together, but that the leather passes around the edges of the base and is cemented to it. If the edges of the base and the leather were merely laid together, the two strips being of equal width, the edges of the leather would in time turn up and impair the usefulness of the sharpening-surface.

By surrounding a non-extensible base with the leather strip, I obtain the object of a non-extensible band and sharpening-surface which will long remain flat and even.

What I claim as my invention, and desire to secure by Letters Patent, is—

1. A razor-strop composed of a band of leather wound around a flexible and non-extensible base, the leather being cemented or fastened to said base, as herein described.

2. The combination of the band *a*, constructed as described—that is, having a non-extensible base cemented thereto, with the handle *b*, rod *c*, and end piece *d*, in the manner and for the purposes substantially as shown.

In testimony that I claim the foregoing I have hereunto set my hand this 20th day of December, 1873.

OLIVER B. HOWARD.

Witnesses:

WM. HENRY CLIFFORD,

FRANK H. JORDAN.